May 12, 1970
H. J. GERRITSEN ET AL
MOTIONLESS HOLOGRAM IMAGING
Original Filed April 27, 1966
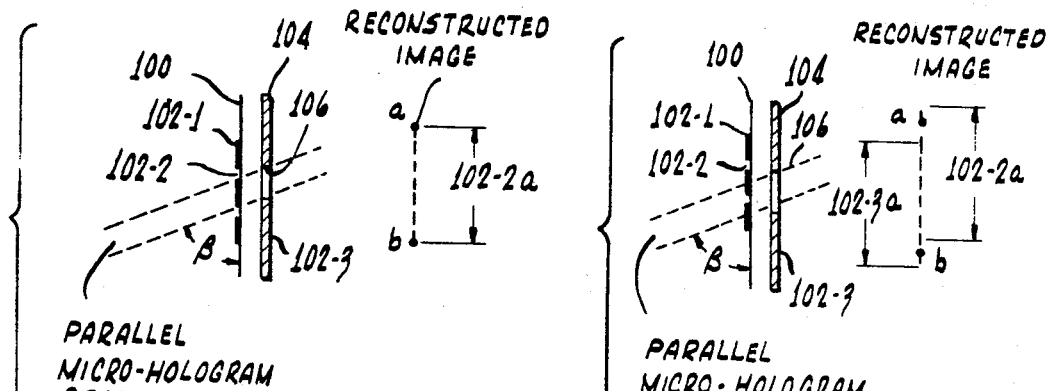
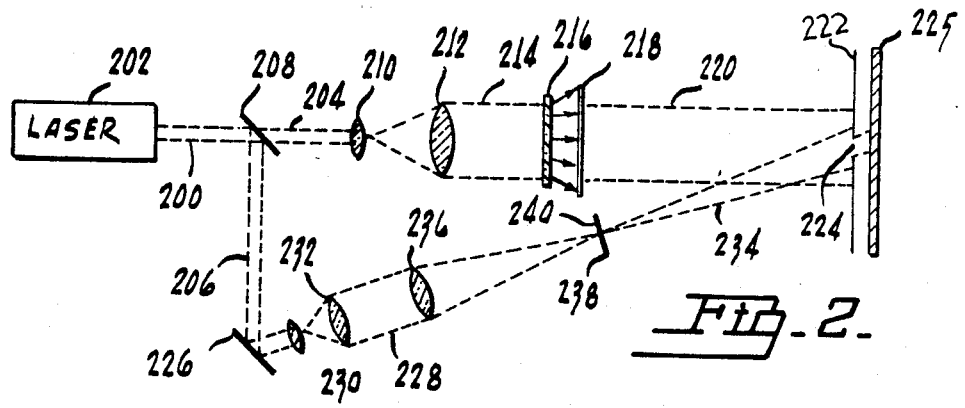
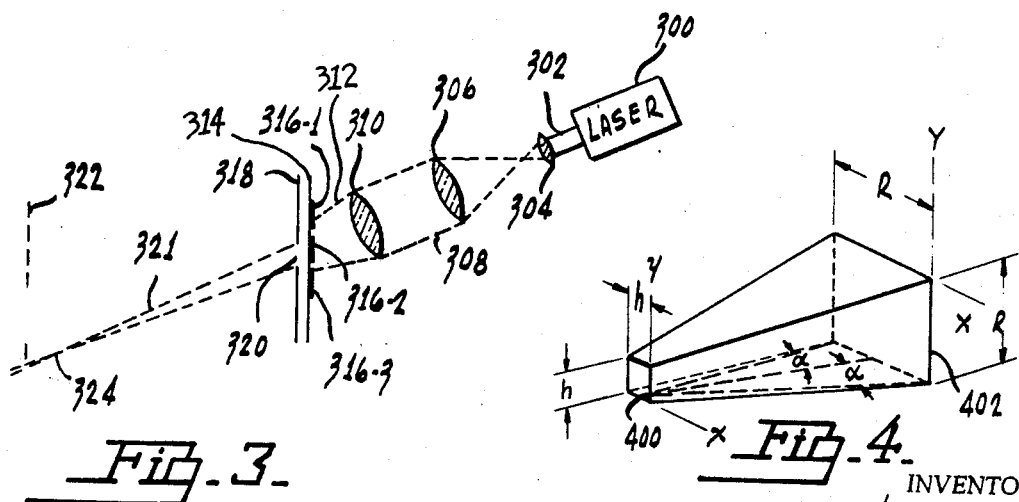
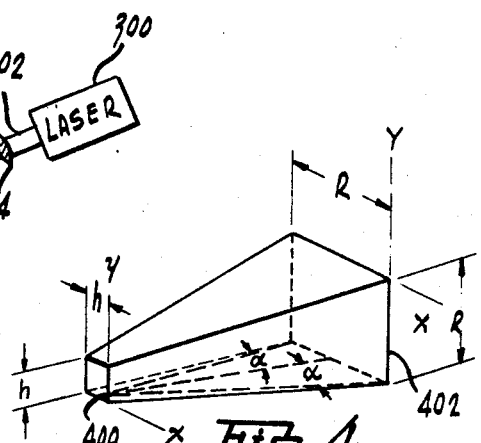
INVENTORS
HENDRIK J. GERRITSEN &
DAVID L. GREENAWAY
BY Edward J. Norton
ATTORNEY

United States Patent Office 3,511,553
Patented May 12, 1970

3,511,553
MOTIONLESS HOLOGRAM IMAGING
Hendrik J. Gerritsen, Princeton Junction, N.J., and David L. Greenaway, Bassersdorf, Switzerland, assignors to RCA Corporation, a corporation of Delaware
Continuation of application Ser. No. 545,753, Apr. 27, 1966. This application July 24, 1969, Ser. No. 847,799
Int. Cl. G02b 27/22
U.S. Cl. 350—3.5
5 Claims

ABSTRACT OF THE DISCLOSURE

A technique for recording and reading out moving microholograms, such as may be used for recording and playing back motion pictures, in a manner such that without the use of a shutter the position of the reconstructed image of a micro-hologram remains fixed with respect to the readout beam despite translational motion of the microhologram being read out in a direction transverse to the readout beam. This is accomplished by utilizing a divergent reference beam in recording the microhologram and then utilizing a convergent readout beam having a degree of convergence which is determined by the degree of divergence of the reference beam.

---

This is a continuation of my copending application, Ser. No. 545,753, filed Apr. 27, 1966, and now abandoned.

This invention relates to holograms, and more particularly, to improved techniques for recording and reading out a hologram of an object in a manner such that the position of the reconstructed image obtained in reading out the hologram remains substantially fixed despite movement of the hologram being read out.

Briefly, a hologram consists of a recording on or in a recording medium of the interference fringes resulting from interference between a reference beam obtained directly from a spatially coherent monochromatic light source, and information light flux obtained from an object to be recorded which is illuminated by the same light source. The object to be recorded may be a three-dimensional object or a two-dimensional object, such as a transparency, for instance.

In the past, the reference beam has consisted of parallel rays of light which are all directed to the recording medium at the same predetermined angle with respect to the plane thereof. The interference fringes result from the fact that the information light flux is directed, at least in part, to the recording medium at an angle other than the aforesaid predetermined angle.

When the object is a transparency, it is the practice to either illuminate it with diffused light or, in the alternative, shine a convergent information beam of light therethrough with the recording medium being placed near, but not at, the crossover point of the convergent information beam. A hologram made with diffused light contains redundant information in that each point thereof contains information pertaining to the whole transparency and is therefore sufficient to reconstruct the entire image of the transparency. On the other hand, each separate point of a hologram made with a convergent information beam contains information about a different distinct point on the transparency and is therefore sufficient to reconstruct solely that point of the image of the transparency.

By illuminating a recorded hologram with a readout beam of spatially coherent monochromatic light, a real image of the original object may be reconstructed. If the relationship between the readout beam and the hologram to be read out is identical in frequency and geometry to the relationship which existed between the reference beam and the recording medium at the time the hologram was recorded, the reconstructed real image will appear at a position with respect to the hologram being read out which is the conjugate of the position of the original object with respect to the recording medium at the time the hologram was made. However, any change in the direction of the readout beam with respect to the plane of the hologram being read out will result in a change in the position of the reconstructed real image. Further, if both the reference beam and the readout beam are composed of parallel rays of light, any translational movement of the hologram beam read out with respect to the readout beam will result in an identical translational movement in the position of the reconstructed real image with respect to the readout beam.

There are cases where even a small amount of movement in the position of the reconstructed real image obtained from a hologram in response to movement of the hologram is undesirable. For example, in the copending patent application, "Hologram Record Pressings," Ser. No. 509,100, filed Nov. 22, 1965, by Gerritsen et al., and assigned the same assignee as the present invention, there is disclosed a record pressing comprising a plurality of separate closely spaced microholograms. (The term "microhologram," as used herein, means a hologram which covers an area no greater than 10 square millimeters.) The information contained in each successive microhologram may relate to a respective successive frame transparency of a motion picture. In viewing the motion picture, the record pressing is moved with respect to the readout beam to sequentially reconstruct a real image of the information contained in each successive microhologram in turn. If the successive microholograms have been made with diffused light flux, as one microhologram is moved out of the readout beam and the next microhologram is moved into them readout beam, the real image corresponding to this one microhologram will grow dim while the real image corresponding to this next microhologram will grow bright. If the successive microholograms have been made with a convergent information beam, as described above rather than dimming, only that portion to this one microhologram remaining within the readout beam will be reconstructed. Similarly, rather than brightening, only that portion of this next microhologram that has moved within the readout beam will be reconstructed.

If the readout beam should be composed of parallel rays of light, for the reasons discussed above, the position of the real image corresponding to this one microhologram going out of view will move, while, at the same time, the position of the real image corresponding to the next microhologram coming into view will also move. The amount of these movements depends upon the dimension of the microholograms in the direction of motion, and is independent of whether the microholograms were made with diffused light flux or a convergent information beam. If each microhologram has a dimension of only one millimeter in the direction of motion, for instance, the movement of the real image corresponding thereto will also be only one millimeter. How objectionable this movement of the real image is depends upon the overall size of the real image. More particularly, if the real image has a dimension in its direction of motion which is quite large compared to one millimeter, such as several centimeters or more, a movement of one millimeter in the real image, which at the same time will be changing in intensity if the microhologram has been made with diffused light, will, for most purposes, be a negligible disturbing factor.

There are cases where even a small amount of movement, such as one millimeter, in the position of the real image cannot be tolerated. This is true, of course, where the size of the reconstituted real image is quite small so that the microhologram has a dimension in the direction of motion thereof which is a significant proportion of the corresponding dimension of the real image. It is also true for larger size real images if extremely high resolution without even the slightest of blurring is required.

In accordance with the present invention, it has been found that a change in the position of the reconstructed real image in response to movement of a microhologram being read out may be practically eliminated if the reference beam utilized in recording the microhologram comprises divergent rays of light having the proper degree of divergence, rather than parallel rays of light, and the readout beam utilized to reconstruct the real image comprises convergent rays of light having the proper degree of convergence, rather than parallel rays of light.

It is therefore an object of the present invention to provide substantially motionless imaging of holograms.

This and other objects, features and advantages of the present invention will become more apparent with the following detailed description taken together with the accompanying drawing in which:

FIGS. 1a and 1b show in diagrammatic form the change in position of the reconstructed image of a translationally moved microhologram which, in accordance with the prior art, has been made with a parallel reference beam and is read out by a parallel readout beam;

FIG. 2 shows in digrammatic form a technique for recording a hologram in accordance with the principles of the present invention;

FIG. 3 shows in diagrammatic form a technique for reading out a hologram which has been recorded in the manner shown in FIG. 2 to produce a reconstructed image having a position which remains substantially fixed in response to translational motion of the hologram being read out, and FIG. 4 is a geometrical diagram which is helpful in explaining the present invention.

For illustrative purposes, it is assumed hereinbelow that the microholograms are made with diffused light flux, although, for the purposes of the present invention they could just as well have been made with a convergent information beam.

Referring to FIG. 1a, there is shown a record medium 100 lying in a given plane. Record medium 100 has a series of separate microholograms recorded thereon among which are microholograms 102-1, 102-2 and 102-3. In cooperative relationship with record medium 100, and situated with respect thereto as shown in FIG. 1a, is mask 104 having an opening 106 therein. More particularly, the relative position of record 100 with respect to mask 104 in FIG. 1a is such that only microhologram 102-2 is in cooperative relationship with opening 106 in mask 104.

A narrow parallel microhologram readout beam 108 is composed of spatially coherent monochromatic light originating from a source such as a laser, not shown. In FIG. 1a beam 108 makes a predetermined angle $\beta$ with the plane of record medium 100 and is positioned to pass through that portion of record medium 100 which is in cooperative relationship with opening 106 in mask 104 which, in the case of FIG. 1a, is microhologram 102-2. This results in the formation of a reconstructed image 102-2a of the information contained solely in microhologram 102-2 which is positioned between points $a$ and $b$ in a plane parallel to the plane of record medium 100.

Reconstructed image 102-2a will lie in a plane parallel to the plane of record medium 100 only if the angle between readout beam 108 and record medium 100 is equal to $\beta$. The actual value of the predetermined angle $\beta$ in any given case depends upon the angle which existed between the plane of the record medium and the parallel reference beam utilized in originally recording the microhologram on the record medium.

Referring now to FIG. 1b, all the conditions therein are identical to those shown in FIG. 1a, except that the position of record medium 100 with respect to that of mask 104 has been shifted slightly so that only the bottom portion of microhologram 102-2 remains within readout beam 108, while at the same time the top portion of microhologram 102-3 is also within readout beam 108. As shown in FIG. 1b, this results in partially overlapping reconstructed images 102-2a and 102-3a, respectively, being formed. Reconstructed image 102-2a corresponds solely with the information contained in microhologram 102-2 and reconstructed image 102-3a corresponds solely with the information contained in microhologram 102-3. Since each point of a microhologram is capable of reconstructing an entire image, reconstructed image 102-2a, shown in FIG. 1b, will be of the same size as reconstructed image 102-2a shown in FIG. 1a. Only a portion of microhologram 102-2 is illuminated by readout beam 108 in FIG. 1b, while the entire microhologram 102-2 is illuminated by readout beam 108 in FIG. 1a, reconstructed image 102-2a in FIG. 1b will be much dimmer than the reconstructed image in FIG. 1a. However, what is most important for the purposes of this invention is that the position of reconstructed image 102-2a is translationally shifted as the position of microhologram 102-2 with respect to readout beam 108 is translationally shifted. Thus, in FIG. 1b, reconstructed image 102-2a no longer is positioned between points $a$ and $b$, respectively, as is the case in FIG. 1a, but is moved upward by a distance equal to the upward shift of microhologram 102-2 in FIG. 1b. At the same time, reconstructed image 102-3a, which is absent in FIG. 1a, appears in FIG. 1b extending from a point below point $a$ to a point below point $b$. Of course, as record medium 100 is shifted still farther, so that microhologram 102-3 assumes a position with respect to readout beam 108 identical to that of microhologram 102-2 in FIG. 1a, reconstructed image 102-2a will vanish and the reconstructed image 102-3a will be posiitoned between points $a$ and $b$, respectively, in a manner identical to that shown for reconstructed image 102-2a in FIG. 1a.

It should be pointed out that the distance between the centers of successive microholograms on record medium 100 is usually of the order of only 1 millimeter, so that the entire shift in the position of the reconstructed image of a microhologram is also of the order on only 1 millimeter. Since, at the same time, the reconstructed image of a microhologram is dimmer when it is positioned "off-center," for many purposes the slight "smearing" or "burring" of the reconstructed image due to a shift in position, which occurs when parallel reference and readout beams are utilized, can be tolerated. However, it would be most desirable to increase the resolution with which "moving" microholograms may be read out by minimizing the shift in position of the reconstructed image of a microhologram in response to the movement of that microhologram. This increase in resolution may be accomplished by the present invention, as described in detail below.

Referring now to FIG. 2, there is shown an illustrative embodiment of apparatus for recording a microhologram in accordance with the principles of the present invention. More specifically, a beam of spatially coherent monochromatic light 200 from laser 202 is split into a first component beam 204 and a second component beam 206 by beam splitting half-mirror 208. Component beam 204 is widened by lenses 210 and 212 into parallel beam 214. Parallel beam 214 is diffused by diffuser 216, which may be opal glass for instance, and then impinges upon the object to be recorded, which comprises transparency 218. Transparency 218, which may be a single frame of a motion picture, for example, modulates the intensity of the light incident thereon to produce information component of light flux 220 which is incident upon mask 222 having an opening 224 therein. Directly behind mask 222 is recording medium 225, which has only that portion thereof which is directly behind opening 224 exposed to the light flux of information component 220.

Component beam 206, after being reflected by mirror 226 is widened into parallel beam 228 by lenses 230 and 232. A divergent reference beam 234 is produced from parallel beam 228 by means of lens 236 having a crossover point 238. Although not essential, pinhole means 240, having a pinhole opening coinciding with crossover point 238, is highly desirable to "clean" the light beam and thereby eliminate any aberrations therein caused by lenses 230, 232 and 236.

Divergent reference beam 234 is incident upon mask 222 in the manner shown in FIG. 2 so that a portion thereof will pass through opening 224 in mask 222 to expose only that portion of recording medium 225 directly behind opening 224. This results in a microhologram being recorded on that portion of recording medium 225 which is directly behind opening 224 in mask 222. This microhologram is composed of a pattern of interference fringes resulting from the interference between divergent reference beam 234 and the light flux from information component 220 at the surface of recording medium 225.

As shown in FIG. 2, transparency 218 lies in a plane which is spaced a predetermined distance from the plane in which recording medium 225 lies. Divergent reference beam 234 has a predetermined degree of divergency which is determined by the position of crossover point 238. In FIG. 2, the position of point 238 lies in the region defined by the planes of transparency 218 and recording medium 225, respectively, and at a distance from the recorded microhologram on recording medium 225 which is at least equal to the predetermined distance between these planes.

In the embodiment shown in FIG. 2, crossover point 238 is a real point. However, it is possible to produce divergent reference beam 234 having the same predetermined degree of divergency by replacing convex lens 236 of FIG. 2 with a concave lens and locating this concave lens between crossover point 238 and recording medium 225 in the path of parallel beam 228. In this case, crossover point 238 will not be a real point, but will be a virtual point.

It will be seen that the resulting interference fringe pattern, which comprises a microhologram of the information contained in the recorded transparency, made with the apparatus shown in FIG. 2, which utilizes a reference beam having a predetermined degree of divergency, will differ considerably from that resulting interference fringe pattern, which comprises a microhologram of the information contained in the same recorded transparency, made with apparatus utilizing a conventional parallel reference beam. In order to properly reconstruct an image from a microhologram made with a divergent reference beam, as described above in connection with FIG. 2, it is necessary to utilize a convergent readout beam, of the type shown in FIG. 3, rather than a conventional parallel readout beam.

Referring now to FIG. 3, laser 300 emits a monochromatic beam of spatially coherent light 302. Beam 302 is widened by lenses 304 and 306 into parallel beam 308. Parallel beam 308 is applied through convex lens 310 to form convergent readout beam 312 having a predetermined degree of convergence. Convergent readout beam 312 impinges upon microhologram record 314 having a series of separate microholograms, such as microholograms 316–1, 316–2 and 316–3, recorded thereon in the manner discussed in connection with FIG. 2.

For illustrative purposes, it is assumed that microhologram record 314 is of the transmission type, rather than of the reflective type, both of which are described in detail in the above-identified Gerritsen et al. patent application. However, in practice, it may be either.

As shown in FIG. 3, on the other side of microhologram record 314 is mask 318 having an opening 320 therein, which opening 320 permits only that portion 322 of convergent readout beam 312 which is in cooperative relationship with only microhologram 316–2 to be read out. The readout of microhologram 316–2 results in the formation of reconstructed image 322. The crossover point of 312 is shown at point 324.

It will be noted that crossover point 324 of the convergent readout beam bears the same geometrical relationship to reconstructed image 322 as the geometrical relationship between crossover point 238 of the divergent reference beam to transparency 218. Thus, in the special case where the frequency of readout laser 300 is identical to that of recording laser 202, so that reconstructed image 322 is identical in size and relative location to that of transparency 218, the degree of convergency of convergent readout beam 312 will be identical to the degree of divergency of divergent reference beam 234. However, even if the respective frequencies of lasers 202 and 300 are different from each other, so that the respective sizes of reconstructed image 322 and transparency 218 are different from each other, the predetermined degree of divergency of readout beam 312 will still correspond proportionally with the degree of divergency of reference beam 234, although in this case it will not be identical therewith. In other words, in all cases the predetermined degree of convergence of reference beam 312 will be such as to have a crossover point 324 which is positioned in the region defined by the respective planes in which microhologram 314 and reconstructed image 322 lie, and which crossover point 324 is at a distance from microhologram 314 at least equal to the distance between these respective planes.

It has been found that when a microhologram is recorded with a divergent reference beam of the type described in connection with FIG. 2 and is then read out with a convergent readout beam of the type described in connection with FIG. 3, the problem of a change in the position of the reconstructed image in response to relative motion of a microhologram with respect to the readout beam, as discussed above in detail in connection with FIGS. 1a and 1b, is eliminated for all practical purposes. More particularly, the position of reconstructed image 322 remains substantially stationary when microhologram record 314 is translationally moved transverse to convergent readout beam 312 to cause microhologram 316–2 to be removed from beam 312 and microhologram 316–3 to enter beam 312.

FIG. 4 shows the geometric relationship between a typical microhologram and a typical reconstructed image of the type disclosed in the present invention. For illustrative purposes, it is assumed that the microhologram 400 is a square having a dimension of h in both the x and y directions, that reconstructed image 402 is a square having a dimension of R in both the x and y directions, that R is very much larger in size than h, and that microhologram 400 was recorded with a proper divergent reference beam and is read out by a proper convergent readout beam. If, as shown in FIG. 4, angle $\alpha$ is the half angle between the middle of microhologram 400 and a corner of reconstrutced image 402, and microhologram 400 is moved an incremental distance, $\Delta l$, in either the x or y direction, the maximum movement of any point in reconstructed image 402 in either the x or y direction will be $$\frac{\sin^2 \alpha}{1+\sin^2 \alpha} \Delta l$$

where $\Delta l$ is the value of the incremental motion of the microhologram 400 in either the x or y direction. It will be seen that so long as $\alpha$ is a relatively small angle, which is normally the case, the maximum movement of any point in reconstructed image 402 in response to a small increment of motion of microhologram 400 will be insignificant. Since most points of reconstructed image 402 will move much less than this maximum value in response to an incremental movement of microhologram 400, reconstructed image 402, taken as a whole remains substantially stationary.

Since the present invention provides a technique which is effective in maintaining the position of the reconstructed image substantially fixed in response to translational motion of a microhologram but not in response to rotational motion of a microhologram, it is desirable that the format in which the microholograms are recorded on a microhologram record be such as to minimize rotational motion of the microhologram as it enters and leaves the readout beam. For instance, if a spiral format, of the type disclosed in the above-identified copending Gerritsen et al. application, is utilized, the minimum diameter of the spiral microhologram recordings should be 10 inches or more to render negligible the rotational movement of a microhologram as it enters and leaves the readout beam. Even better, of course, would be an arrangement in which the entire motion of the microhologram with respect to the readout beam, as well as with respect to the recording reference beam, is translational.

What is claimed is:

1. A motionless hologram imaging method comprising the steps of recording on a medium at least one microhologram of an object employing a divergent reference beam of wave energy having a first predetermined angle of divergence and a first predetermined wavelength, illuminating said recorded microhologram with a convergent readout beam of said wave energy having a second predetermined angle of convergence and a second predetermined wavelength, said second predetermined angle being equal to the product of the conjugate of said first predetermined angle multiplied by a proportionality factor equal to the ratio of said first predetermined wavelength to said second predetermined wavelength, and translationally moving said medium including said recorded microhologram in a transverse direction with respect to said readout beam while said microhologram is being illuminated, whereby a real image of said object is derived which remains substantially motionless with respect to said readout beam despite said translational movement.

2. The method defined in claim 1, wherein said first and second predetermined wavelengths are equal to each other, whereby said second predetermined degree of convergence is the conjugate of said first predetermined degree of divergence.

3. The method defined in claim 1, wherein said step of recording comprises the steps of recording on said medium in succession each of a series of adjacent juxtaposed microholograms of separate objects. employing said divergent reference beam, wherein said step of illuminating a microhologram with said readout beam comprises utilizing a readout beam having an illuminating cross section of a limited size with respect to the cross section of a microhologram which is capable of illuminating any one of said series of microholograms without necessarily simultaneously also illuminating any other of said series of microholograms, and wherein said step of moving includes the step of moving said medium in a direction to illuminate adjacent microholograms in succession.

4. The method defined in claim 3, wherein said medium is moved continuously while said microholograms are being continuously illuminated in succession.

5. The method defined in claim 3, wherein the respective objects associated with adjacent ones of said series of microholograms are successive frames of a motion picture.

References Cited

Leith, Upatnieks and Haines: "Microscopy by Wavefront Reconstruction," in J. Opt. Soc. Am., vol. 55, No. 8, August 1965, pp. 981–986.

DAVID SCHONBERG, Primary Examiner

R. L. SHERMAN, Assistant Examiner